F. T. O'GRADY.
COLOR MOTION PICTURE PHOTOGRAPHY.
APPLICATION FILED SEPT. 28, 1920.
1,402,371.
Patented Jan. 3, 1922.
4 SHEETS—SHEET 1.
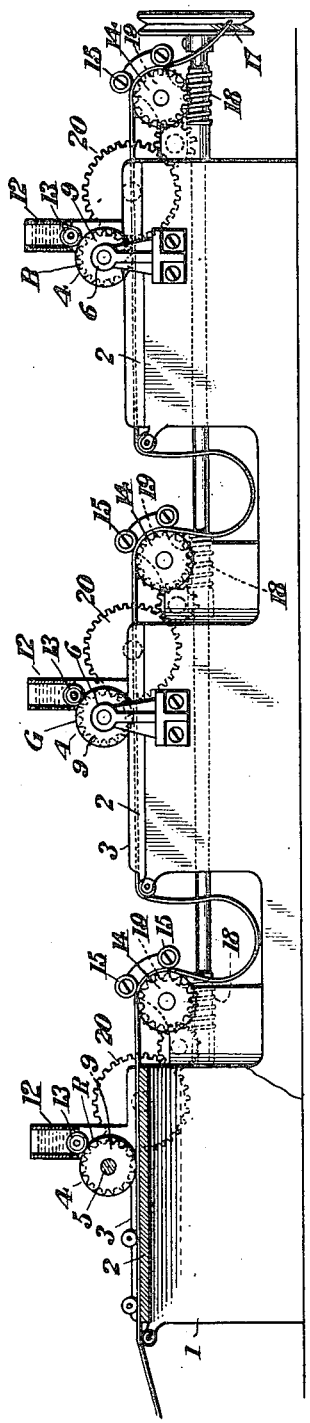
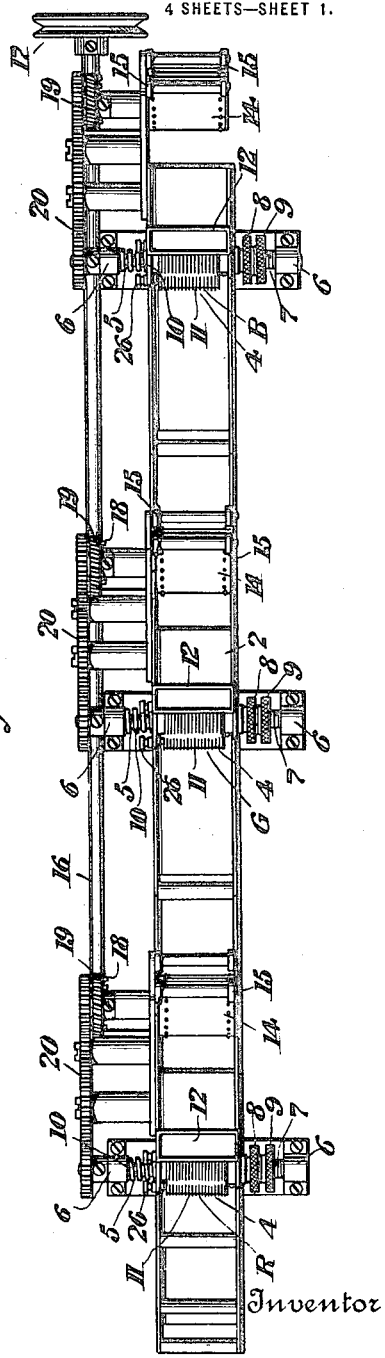
Inventor
Frederick T. O'Grady
By
his Attorneys.

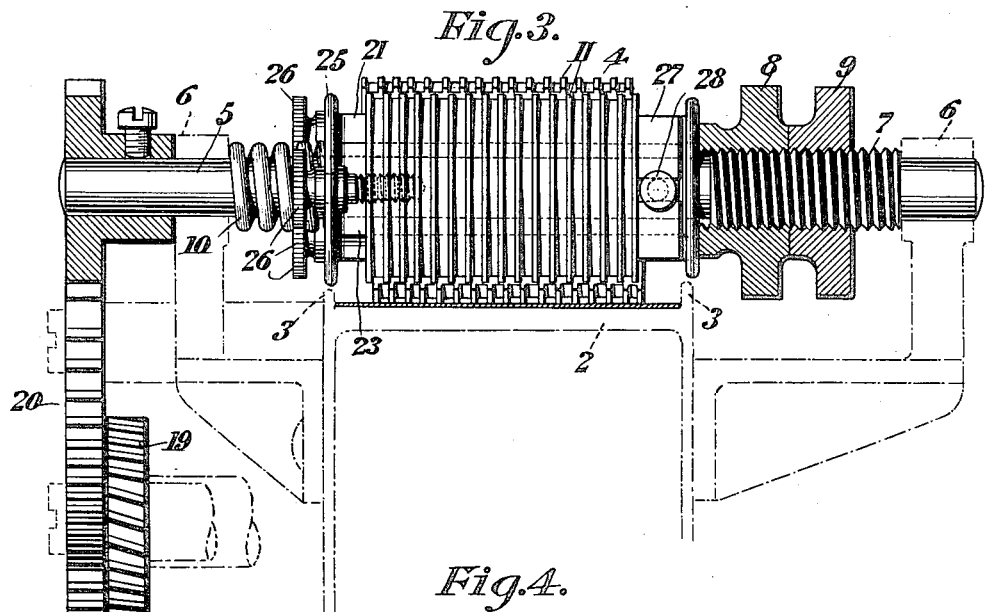
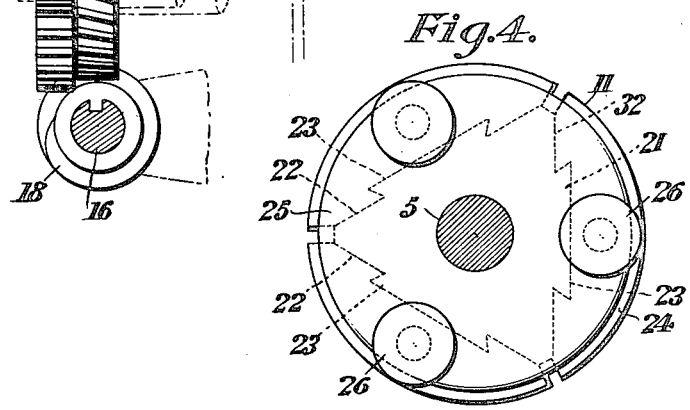
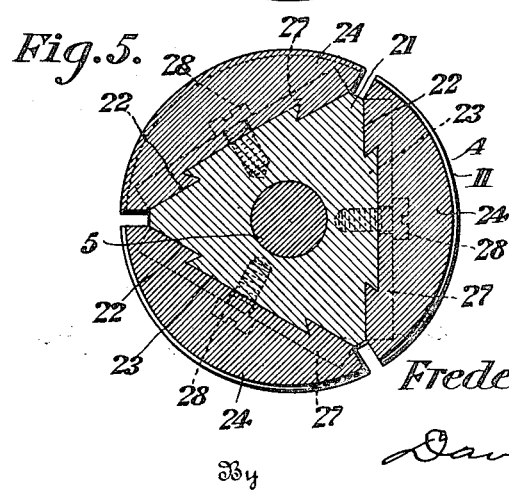

F. T. O'GRADY.
COLOR MOTION PICTURE PHOTOGRAPHY.
APPLICATION FILED SEPT. 28, 1920.
1,402,371.
Patented Jan. 3, 1922.
4 SHEETS—SHEET 3.
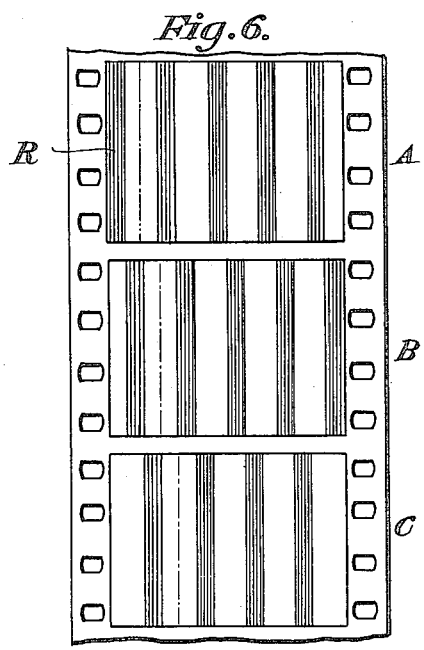
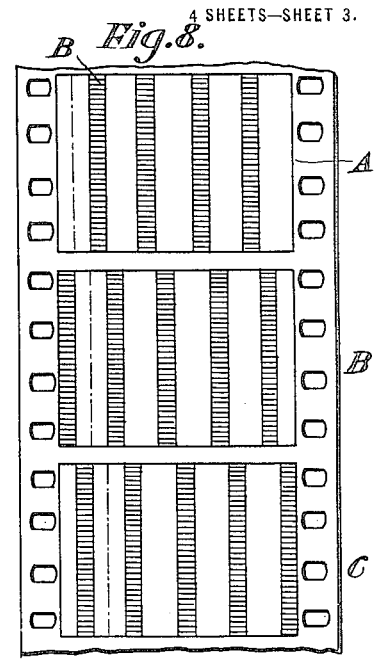
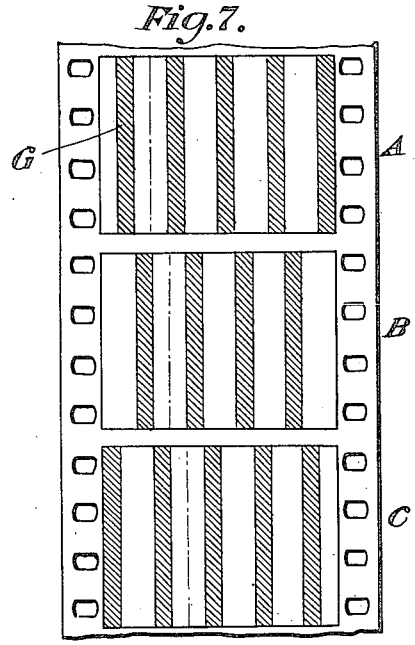
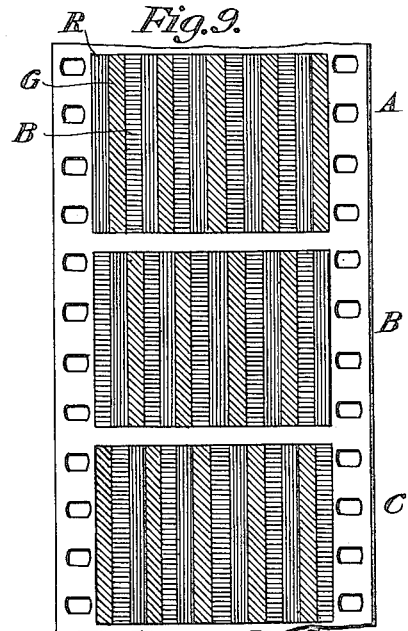
Inventor
Frederick T. O'Grady
By
his Attorneys

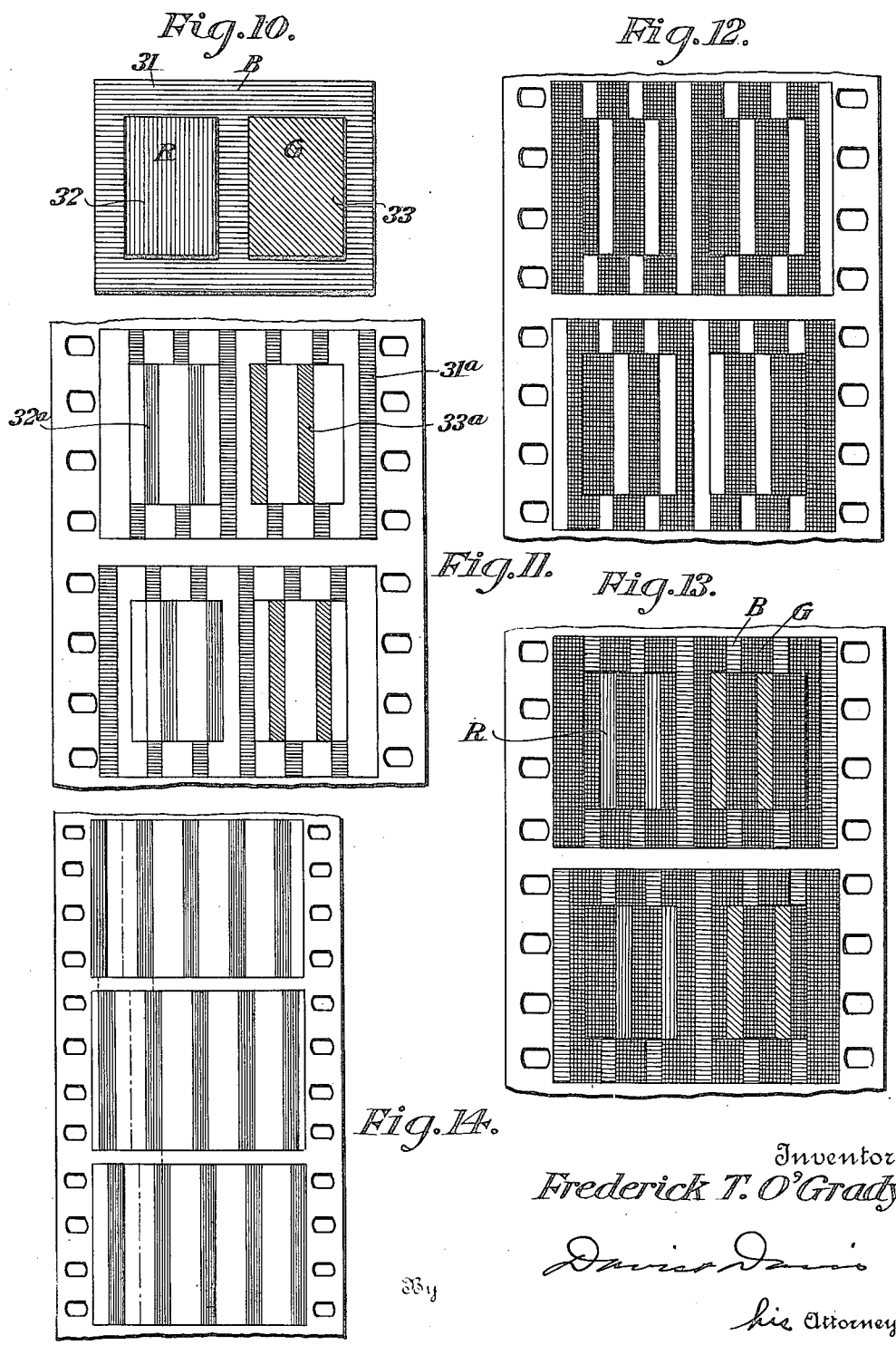

UNITED STATES PATENT OFFICE.

FREDERICK THOMAS O'GRADY, OF FLUSHING, NEW YORK, ASSIGNOR OF ONE-HALF TO HENRY L. MULLER, OF WHITESTONE, NEW YORK.

COLOR-MOTION-PICTURE PHOTOGRAPHY.

1,402,371. Specification of Letters Patent. Patented Jan. 3, 1922.

Application filed September 28, 1920. Serial No. 413,258.

*To all whom it may concern:*

Be it known that I, FREDERICK THOMAS O'GRADY, a citizen of the United States, and resident of Flushing, in the county of Queens and State of New York, have invented certain new and useful Improvements in Color-Motion-Picture Photography, of which the following is a specification.

This invention relates to a method for the production, by photography, of motion pictures in natural colors by the use of single emulsion coated motion picture films.

The methods of color motion picture photography heretofore used, involved, or required the use of, complicated and extensive devices and apparatus in the preparation of the film and in the projection of the pictures. The cameras and projection apparatus used in connection with these old methods are provided with special attachments for color filters. One of the best known of these old methods requires that double the number of exposures shall be made as in the ordinary monochrome picture production methods, and obviously this requires double the length of film. This method also requires that the film shall have, during the operation of both taking and projecting the picture, twice the speed of the ordinary monochrome motion picture film. Such increase in speed involves prohibitive expense and complicated and expensive cameras and projectors for the manipulation of the films; also, this rapid changing from one color to the other causes color pulsation and fringing of color, which in turn, when viewed on the screen, causes considerable optical discomfort to the observer.

Other methods involve the use of double emulsion coated films, which have to undergo the double operation of printing, superimposing of the two images, immersion in numerous color tinting and toning solutions, water-proofing, etc., the results of which are not only unsatisfactory, but entirely uncommercial.

In carrying out this invention a standard negative film, which has been rendered sensitive to all the colors of the spectrum, is used. Such films are known as panchromatic emulsion films. To this negative film, on the emulsion side, are applied color filters. The film is then exposed in the usual way in a standard motion picture camera. The color filters are then washed from the film and the negative then developed. From the negative thus produced a positive print is made on a standard positive film in the ordinary way on any motion picture printing machine. After this positive print has been developed and dried the color filters are applied thereto in positions corresponding identically to the positions which said color filters occupied on the original negative film. After the color filters have been applied to the standard positive film, the film may be used in the ordinary standard projecting apparatus without the use of any additional attachment for color filters or screens, and the film may be moved through the projecting machine at the usual or standard speed.

One of the main objects of this invention is to provide a method of making motion pictures in natural colors, wherein a standard panchromatic negative, and a standard single emulsion coated positive film may be used, whereby the actual photographing and projection may be done on any standard motion picture camera and projector, at the standard speed of sixteen pictures per second.

There are other important objects and advantages of the invention which will appear hereinafter.

In the drawings, Fig. 1 is a side elevation of a machine for ruling the color-filter lines on the film, parts being broken away and shown in sectional view to more clearly illustrate the construction;

Fig. 2 a plan view thereof;

Fig. 3 a transverse vertical sectional view showing one of the color-filter ruling rollers;

Fig. 4 an end elevation of one of the color-filter ruling rollers;

Fig. 5 a transverse sectional view of one of the ruling rollers;

Fig. 6 a detail view of a portion of the negative film ruled with the red color-filter lines;

Fig. 7 a similar view of a portion of the negative film ruled with the green filter lines;

Fig. 8 a similar view of a portion of the negative film ruled with the blue filter lines;

Fig. 9 a detail view of a portion of the negative film completely ruled with the three color-filter lines;

Fig. 10 a detail view of three plates to be photographed, said plates being colored red, blue and green;

Fig. 11 a detail view of a part of a negative film as it appears after photographing the colored plates, illustrated in Fig. 7;

Fig. 12 a detail view of a part of a positive film printed from the negative film shown in Fig. 11;

Fig. 13 a similar view of the positive film shown in Fig. 12, after the color-filter lines have been marked thereon to correspond with the original color-filter markings of the negative film; and Fig. 14 a detail of a portion of a negative film similar to Fig. 6, showing the color filter lines only slightly offset transversely of the film.

In carrying this invention into effect, a standard panchromatic emulsion negative film is marked longitudinally with a multiplicity of fine color-filter lines. As indicated in Fig. 9, these color-filter lines run side by side, close together, and cover the entire emulsion coated portion of the film. The lines are made sectional, considered longitudinally of the film, each set of lines running a distance equal to one picture area on the film. As indicated in Fig. 9, the color-filter lines are continuous only throughout a short portion of the film, and are only of sufficient length to cover that portion of the film usually occupied by a single picture. As shown in Fig. 9, there is a blank space between each picture area, that is to say, there is a blank space between each picture area which is not covered by the color-filter lines. Of course, this space is covered or coated with the usual emulsion coat, but that emulsion coat is not treated with the color-filter lines. The color-filter lines are so arranged, that those in one picture area are staggered or stepped transversely of the film, with respect to the corresponding color-filter lines in the adjoining picture areas, so that the color-filter lines are not parallel and continuous throughout the length of the film, but are only parallel and continuous throughout the short section of the film usually occupied by a single picture. The object of making the color filter lines discontinuous in adjoining picture areas is to prevent any tendency of the lines being seen when the positive film is projected and viewed on the screen; and also to insure a uniform shade of each color area of the photographed object when the positive film is projected and viewed on the screen.

Preferably, the color filters are red, green and blue or blue-violet, as indicated by the letters R, G, B on the drawings. These color filters are repeated in the stepped sequence throughout the width of the film, but as hereinbefore stated, the red filter lines of one picture area will not be in longitudinal alignment with the red filter lines of the adjoining picture areas, but will be in alignment with the green filter lines and the blue filter lines in the adjoining picture areas, thereby effectively preventing any streaked or lined effect on the projected picture. Preferably these color-filter lines are very fine and may be approximately 1/1000 of an inch wide. Because of the discontinuous form of the lines, considered longitudinally of the film, these color-filter lines may be of considerable width, however, for instance, 2/1000 of an inch measured transversely of the film, without danger of producing a lined or streaked effect on the projected picture. These color-filter lines are ruled or marked directly on the emulsion side of the film; and as hereinbefore set forth, a standard, panchromatic emulsion negative film is used.

In Figs. 1 and 2 is illustrated a machine designed for marking the color-filter lines on the film. This machine comprises a base 1 supporting three marking tables 2 directly in line with each other and separated suitable distances. Each table is formed with vertical side flanges 3 which serve as guides for the longitudinal edges of the film, the table between said flanges being just equal to the width of the film to be treated. Over each table and adapted to bear on the film, is mounted a filter marking roller 4, said roller being secured by a key and key-way, or other slidable connection, to a transverse shaft 5 suitably supported in bearing 6. Each shaft is formed with a finely threaded portion 7 on which is screwed an adjusting nut 8 and a locking jam nut 9. The adjusting nut 8 engages one side of the roller 4 and is adapted to move it against the tension of a spring 10, arranged at the opposite end of the roller between the roller and the adjacent bearing 6. By turning the adjusting nut 8 the marking roller may be very accurately adjusted transversely of the table 2. Each roller is provided with very fine annular ruling or marking ribs 11. These ribs preferably are 1/1000 of an inch thick and 2/1000 of an inch separated from each other. The thickness of the ribs and the distance between the ribs may be materially increased if desired. Above each table is arranged a color receptacle 12, in the lower end of which is arranged a color roller 13 which receives the color from the receptacle 12 and applies it to the edges of the marking ribs 11. As shown in Fig. 1, the roller marked R is designed to mark red color-filter lines on the film; the roller marked G is arranged to mark green filter lines on the film, and the roller marked B is arranged to mark blue filter lines on the film. By means of the adjusting nuts and the springs 10, the marking rollers may be so arranged transversely of the film that the green filter lines will lie next to the red lines and the blue lines will lie next to the green lines. The spaces between the marking ribs of one roller are wide enough to permit the other marking rollers to place their color filters between the color filters marked thereon by the other rollers so that after the film is passed under the three marking rollers its entire surface will be covered with the color-filter lines alternating red, green and blue-violet.

At the forward end of each table 2 is arranged a film drawing roller 14 which is provided with sprocket teeth adapted to fit in the usual perforations along the edges of the film. Suitable pressure rolls 15 are provided to hold the film in engagement with the sprocket teeth of the film drawing roller. The film drawing rollers are driven by a longitudinally extending shaft 16 provided at one end with a driving pulley 17 and carrying worms 18. The worms 18 engage worm wheels 19 on the shafts of the film drawing rollers 14, so that all of said rollers move at a uniform speed. The shafts of the film drawing rollers are connected by trains of gearing 20 to the shafts of the marking rollers so that all of said rollers move at a uniform speed. The spaces between the tables 2 are sufficient to permit the lines placed thereon by one marking roller to dry before the film is presented to the next marking roller. It is manifest that these spaces may be as great as desired to secure the complete drying of one set of color filters before the film is presented to the roller next in the series.

The ruling or marking ribs 11 of the color applying rollers are not continuous and parallel. These ribs are formed on segments, there being three segments to each roller, as clearly illustrated in Figs. 4 and 5. Each marking roller comprises a body part 21 having a central bore or axial opening to receive the shaft 5. This body part is triangular in transverse section having three flat faces 22. Each face 22 is formed with an undercut guide rib 23 running longitudinally thereof. Marking roller segments 24, having flat inner faces, are grooved to receive the guide ribs, as shown clearly in Fig. 5. Each marking roller segment is provided with the marking ribs 11, spaced apart as described. When the three marking segments are assembled on the body part there are longitudinally extending slots between adjoining edges of the segments, said slots being due to the open spaces between the marking segments. The body part of the roller is formed at one end, the left-hand end, as illustrated in Fig. 3, with an annular flange or head 25. Mounted in this flange or head are three adjusting screws 26, the inner threaded ends of which enter the marking segments, as shown clearly in Fig. 3, each segment being provided with an adjusting screw. It is manifest that by rotating the adjusting screws, the marking segments may be nicely adjusted along the flat faces of the body part of the roller. Each marking segment is provided with a longitudinally extending flange 27 which is centrally slotted to receive a clamping screw 28 mounted in the central body part of the roller. When the marking segments have been properly adjusted longitudinally on their support, they may be locked by means of the screws 28.

The marking segments are adjusted longitudinally so that the marking ribs of one segment will be out of line with the marking ribs of the other segments. The purpose of this is to prevent the color-filter lines being continuous throughout the length of the film. By using a marking roller constructed as described the filter lines will be discontinuous or staggered transversely of the film. The marking rollers during each rotation will mark three distinct sets of color-filter lines on the films, each set being stepped or offset transversely from the other set. As shown in the drawings, the marking rollers are so designed that each marking segment will place on the film color-filter lines equal in length to a single picture area. These picture areas are of standard size for all standard motion picture cameras. While I have shown the marking rollers made up of three segments, it is manifest that they may be made up of any desired number of segments, it being only necessary that the marking ribs of the segments be offset transversely in respect to the marking ribs of the other segments so that the color-filter lines will not be continuous throughout the length of the film.

As shown in the drawings, each marking roller is made up of three marking segments and the three marking rollers will be so adjusted transversely of the film that the second and third marking rollers will apply their color-filter lines in the spaces left blank by the first marking roller. Fig. 6 indicates a section of negative film marked by the first marking roller which, as indicated, is applied to the red filter lines. It will be noted that these lines are offset one space to the right in each picture area. It will also be noted that there are two blank spaces between each red filter line. Fig. 7 illustrates a part of the negative film marked with the green filter lines, these lines being offset in adjoining picture areas substantially the same as the red filter lines, shown in Fig. 6; and Fig. 8 shows a corresponding part of the negative film marked with the blue filter lines. In Fig. 9 is illustrated a part of a negative film completely marked with all of the filter lines and showing the appearance of the negative film after it has passed all of the marking rollers. It is to be noted that the filter lines are parallel and continuous throughout each picture area. Each picture area is indicated in Figs. 6, 7, 8 and 9 by the letters A, B and C. It is also to be noted that the color-filter lines in one picture area are out of alignment with the corresponding color-filter lines in the adjoining picture area. The red color-filter lines of the picture area B of Fig. 9 are longitudinally in line with the green color-filter lines of the picture area A and with the blue filters of the picture area C, so that no two sets of corresponding color-filter lines are longitudinally in line with adjoining picture areas. This is very important as it completely prevents any streaked or lined effect in the projected picture, and also insures a uniform shade of each color area of the picture record when projected on the screen.

It is manifest that by adjusting the marking rollers properly on their shafts, the marking segments will apply the color filters as indicated in Figs. 6 to 9, inclusive.

A negative film marked with the filters may be exposed in an ordinary motion picture camera, the rate of exposure being the same as when a standard mono-chromatic emulsion coated negative film is used. It is unnecessary to use any additional color filters or screens or other devices, except that it is of advantage to use a compensating yellow color filter capped either on the front or rear of the lens, or between the lens combinations. This yellow color filter is used for the purpose of absorbing the excessive ultra-violet rays; it also serves as means for compensating for unequal pan-chromatic values of the film emulsion. The balancing of unequal pan-chromatic values can be also nicely adjusted by varying the depth of or the width of the color-filter lines.

In exposing the negative film in the camera the photographic images are affected by the color-filter lines on the film in such a way that the colors of the object photographed are filtered, that it to say are permitted to pass only through their respective color filters, so that the red rays will pass only through the red color filters, green rays only through the green color filters, while blues and blue-violet rays will pass only through the blue, or blue-violet color filters. The result is that each particular color after exposure of the film in the camera, is represented by a series of graduated dark lines on the emulsion of the film, with intervening clear spaces where the filter lines complementary to the color photographed has prevented exposure of the emulsion. This will be readily understood by reference to Figs. 10 and 11. Fig. 10 illustrates a blue back ground 31, a red plate 32 and a green plate 33, these two plates being placed against the blue background. Fig. 11 represents a photographic color record of the blue background and the red and green plates illustrated in Fig. 10. The dark lines $32^a$ in Fig. 11 represent exposure passed through the red filter lines, that is to say, said dark lines $32^a$, represent the effect on the emulsion of the red rays from plate 32 which have passed through the red filter lines on the negative film. The dark lines $33^a$ represent the effect on the emulsion of the green rays from the plate 33 which have passed through the green filter lines on the negative film; and the dark lines $31^a$ represent the effect of the blue rays that have passed through the blue or blue-violet filter lines on the negative film from the blue background 31. The clear spaces intervening between the dark lines $31^a$ represent the spaces on the film that were covered by the red and green filter lines. The clear spaces between the dark lines $32^a$ represent the spaces on the film that were covered by the blue and green color-filter lines on the negative film while the clear spaces between the dark line $33^a$ represent the spaces that were covered by the blue and red filter lines.

In Fig. 11 is illustrated two adjoining picture areas, in each of which is a photographic representation of the plates shown in Fig. 10, and illustrating the offset effect in the disposition of the color-filter lines considered longitudinally of the film.

After the negative film is exposed it is washed in running water or other suitable liquid to completely remove the color filters. This must be done before the negative is developed. This is most important for the reason that positive films are made from the negative by printing in the ordinary way as in making mono-chrome prints. If the filters were not washed from the negative they would interfere with the action of the light used in printing and prevent it passing through the color-filter lines. After the printing and development, a photograph of the plates as shown in Fig. 10 will appear as shown in Fig. 11. It will, of course, be understood that in the drawings the width of the color-filter lines is greatly exaggerated, and that on a negative film of normal size these lines will be very fine. After it is developed the negative film has the appearance of a black and white negative, but is lined to correspond with the lines of the color filters through which the exposure was made. It also possesses latent color values of the object photographed, in mono-chrome form. These lines, however, are so fine as to be hardly perceivable with the naked eye.

After the negative film is developed a positive print is made from it in the ordinary way on any standard motion picture printing machine, using standard positive films. A positive film print made from the negative shown in Fig. 11 will appear as shown in Fig. 12. The emulsion will be affected by the light passing through the clear spaces of the negative so that dark spaces will be produced in the printing, corresponding to the light spaces of the negative. The dark spaces on the negative will hold back light, resulting in clear spaces in the positive print. This is clearly indicated in Fig. 12. When the positive print is developed it is then passed through the color applying machine in precisely the same way that the negative film was passed, and the color filters are placed on the positive film. In the development of the negative film there will be a certain minute transverse shrinkage. In the development of the positive film there also will be a minute transverse shrinkage. The rolls for applying the color-filter lines to the positive film must be, of course, slightly smaller than the rolls used in applying the color-filter lines to the negative film, in order to compensate for the minute transverse shrinkage of the films during development and drying. There will, of course, be a slight longitudinal shrinkage in both the negative and positive films during development and drying. This longitudinal shrinkage is so minute that it will hardly be necessary to compensate for it in the marking rollers for the positive film. If the color-filter lines should extend slightly beyond the picture areas, they will merely run into the blank film spaces between the picture areas. However, if found desirable, the marking rollers for the positive film may be very slightly reduced in diameter, or the marking segments may be slightly reduced in size. In applying the color-filter lines to the positive print, the ruling rollers are so adjusted that their particular color lines correspond and apply themselves to their particular color representations in the positive print, as follows: The blue filter lines will cover the clear spaces in the blue background; the red filter lines will cover the clear spaces formed by the dark lines 32ª and the green filter lines will cover the clear spaces formed by the dark lines 33ª. When the positive film has been lined or marked with the color filters it has the appearance illustrated in Fig. 13. The positive film thus produced can be projected on a suitable screen by means of any standard motion picture machine without additional filters or screens or other attachments and may be run at the same rate of speed as the standard mono-chrome motion picture record of the object photographed, in substantially its natural colors, and with a marked stereoscopic effect. This stereoscopic effect results from the opaque lines in the positive film and gives to the photographed object an appearance of relief and solidity. This is a marked improvement over the ordinary mono-chrome moving picture, and is in addition to the color effect secured.

In Fig. 14 is shown a slightly modified arrangement of the color-filter lines. As shown in this view, the color-filter lines of one picture area are only slightly offset from the color-filter lines of the adjacent picture areas, so that there will be a slight overlapping of the corresponding color-filter lines in adjoining picture areas. This will still further tend to break up the longitudinal color-filter lines and effectually prevent streaking in the picture as viewed on the screen.

What I claim is:

1. The method of making positive films for the projection of motion pictures in colors, consisting in first marking on the emulsion side of a negative film a multiplicity of color-filter lines, said color-filter lines being arranged side by side and covering the entire emulsion coat transversely of the film, said lines extending longitudinally a fixed distance to cover a predetermined picture area, the color-filter lines in adjoining picture areas of the film being offset or staggered transversely of the film, exposing the filter area of said marked negative film in a camera to obtain a series of images thereon, washing the color-filter lines from the exposed negative film, then developing the said film to fix the images thereon, making a print of said negative film on a positive film, developing said positive film to fix the images thereon, and then marking on the developed and fixed positive film color-filter lines corresponding exactly in number and position and character with the color-filter lines marked originally on the negative film.

2. The method of making positive films for the projection of motion pictures in colors, consisting in first providing the emulsion side of a negative film with a multiplicity of color-filter lines, said color-filter lines being arranged side by side and covering the entire emulsion coat transversely of the film, said lines extending longitudinally a fixed distance to cover a predetermined picture area, the color-filter lines in adjoining picture areas of the film being off-set or staggered transversely of the film, exposing the filter area of said marked negative film in a camera to obtain a series of images thereon, removing the color-filter lines from the exposed negative film, then developing the said film to fix the images thereon, making a print of said negative film on a positive film, developing said positive film to fix the images thereon, and then placing on the developed and fixed positive film color-filter lines corresponding exactly in number and position and character with the color-filter lines marked originally on the negative film.

3. The method of making positive films for the projection of motion pictures in colors, consisting in first marking on the emulsion side of a negative film a multiplicity of color-filter lines, said color-filter lines being arranged side by side and covering the entire emulsion coat transversely of the film, said lines extending longitudinally to cover a predetermined picture area and being repeated throughout the length of the film to cover a multiplicity of picture areas, the color-filter lines in one picture area being out of longitudinal line with the corresponding color-filter lines of an adjoining picture area, exposing the filter area of said marked negative film in a camera to obtain a series of images thereon, washing the color-filter lines from the exposed negative film, then developing the said film to fix the images thereon, making a print of said negative film on a positive film, developing said positive film to fix the images thereon, and then marking on the developed and fixed positive film color-filter lines corresponding exactly in number and position and character with the color-filter lines marked originally on the negative film.

4. A positive film for the projection of motion pictures in colors, provided with longitudinally extending color-filter lines, said color-filter lines being arranged side by side and covering the entire emulsion coat transversely of the film, said lines extending longitudinally to cover a predetermined picture area and being repeated throughout the length of the film to cover a multiplicity of picture areas, the color-filter lines in one picture area being out of longitudinal line with the corresponding color-filter lines of an adjoining picture area.

In testimony whereof I hereunto affix my signature.

FREDERICK THOMAS O'GRADY.